INVENTOR

GEORGE ARTHUR WILLIAMSON

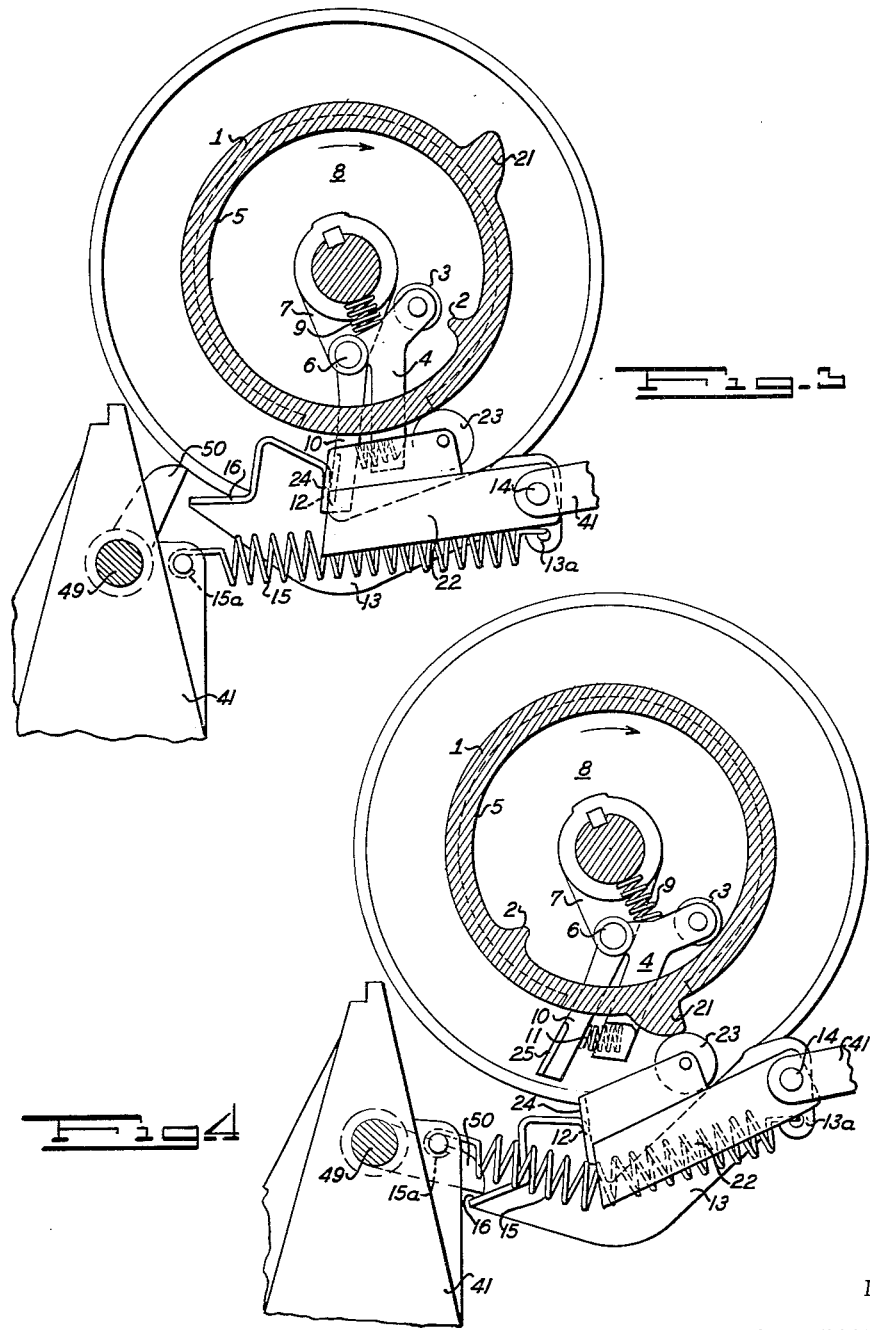

United States Patent Office 3,092,226
Patented June 4, 1963

3,092,226
SAFETY DEVICE FOR TRIP DOG OPERATION IN HAY BALERS
George Arthur Williamson, Katandra West, via Tallygaroopna, Victoria, Australia (16 McCracken St., Shepparton, Victoria, Australia)
Filed July 5, 1960, Ser. No. 40,763
4 Claims. (Cl. 192—22)

This invention relates to a safety device for trip dog operation in hay balers. In the operation of mechanical hay balers a power driven plunger compresses loose hay in a bale chamber until a predetermined quantity has been compressed. Then a pair of needles are actuated to rise in the path of the plunger and co-operate with other mechanisms to tie the compressed bale with twine or wire.

The actuation of the needles is initiated by a tripping device which includes a trip dog assembly, the functioning of which, in correlation with the plunger, is extremely important since a rearward, or compressing movement of the plunger when the needles are in other than the correct relative position would cause serious damage to elements of the machine.

Correct synchronization of the needle actuating mechanism and the plunger can be upset in practice by the momentary malfunctioning of the trip dog assembly. The latter includes a trip dog which is operative to drive-connect a clutch, with the needle actuating mechanism at a precise moment. A plunger stop dog is provided to guard against the resultant damage which would accrue from such malfunctioning of the trip dog assembly. The plunger stop dog is automatically disposed in the path of the plunger when the needles are in a vulnerable position and its function is to arrest the rearward or compressing movement of the plunger.

However, the drive source cannot be instantaneously stopped in this way and a safety shear bolt is provided, usually in the flywheel of the drive source, which bolt shears under the shock and stress of the suddenly arrested plunger thereby preventing further damage to the machine.

Obviously, whenever this safety device operates the machine must be shut down and a new shear bolt fitted, which constitutes a loss of valuable time.

The present invention relates to a safety device for trip dog operation in hay balers and has for its primary object to provide means, readily attachable to existing machines, which will prevent the said clutch from driving the needle actuating mechanism until the trip dog and clutch housing are in a predetermined safe relative position.

With the above stated object in view there is provided, according to the invention, in a hay baler of the type having a needle actuating mechanism, a clutch for selectively driving the needle actuating mechanism, a trip dog for selectively coupling said clutch and needle actuating mechanism and a safety device for said trip dog, said safety device comprising: a rocker arm operatively engageable with said trip dog to maintain said trip dog in a first inoperative position, a cam on said clutch for engaging said rocker arm to periodically displace the same out of operative engagement with said trip dog, means coupled to said rocker arm and defining a pivot axis about which said rocker arm pivots during the periodic displacement thereof, a trip release lever operatively engaged with said trip dog to selectively maintain the same in said first position, said trip release lever being selectively displaceable out of engagement with the trip dog, said trip release lever being coupled to said means and pivoting about said axis during displacement thereof, said trip dog being adapted to couple said clutch and needle actuating mechanism in driving relation when said trip release lever and said rocker arm are displaced.

One practical arrangement of the invention will now be described with reference to the accompanying drawings in which:

FIGURE 3 is a sectional view taken on the line III—III of FIG. 2.

FIGURE 4 is a sectional view similar to FIG. 3 but with the trip dog and safety device released.

Figure 1:
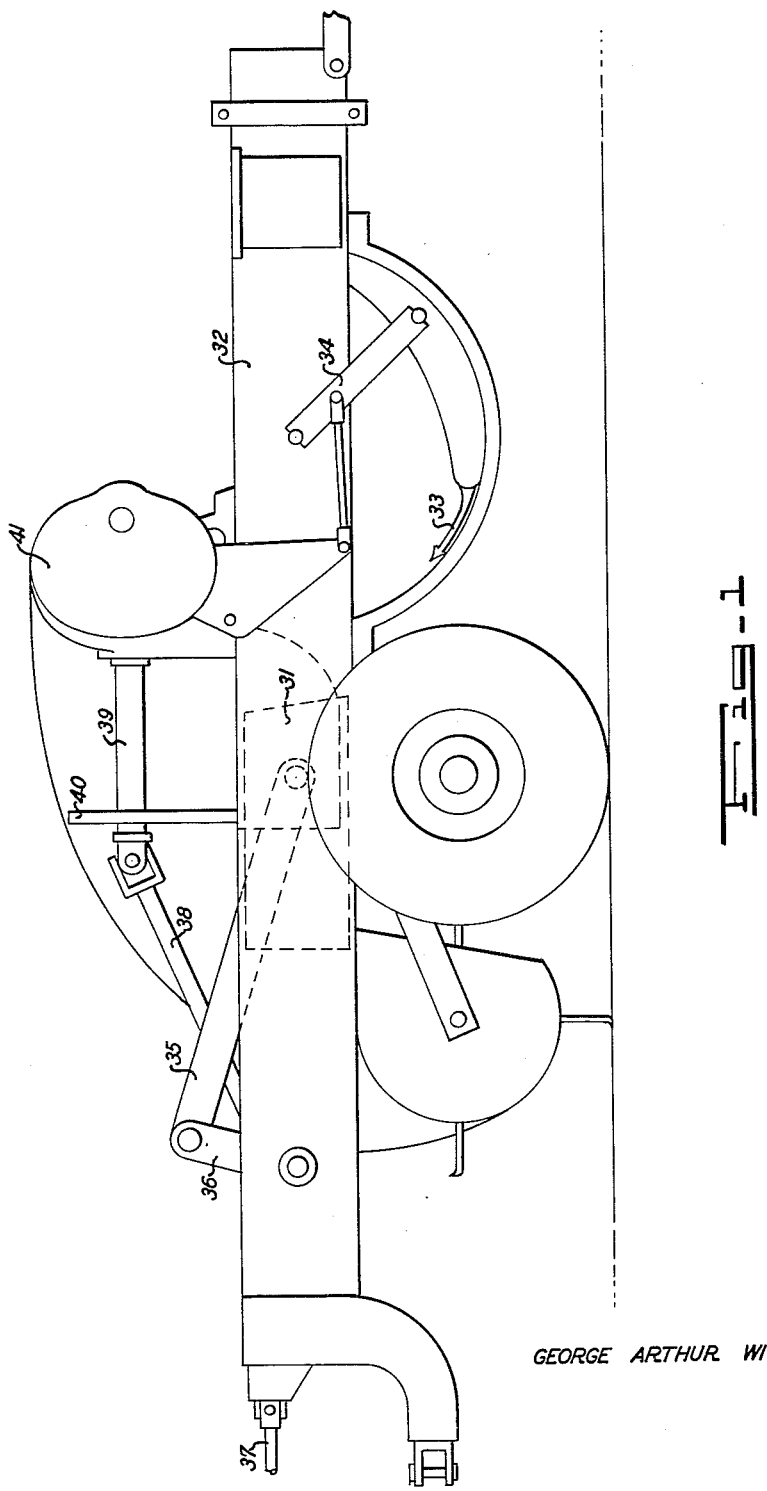
FIGURE 1 is a side elevation of a typical mechanical hay baler having a trip dog mechanism to which the invention is applied.

Referring now to FIG. 1 of the drawings, known parts of the hay baler comprise a power driven plunger 31; a bale chamber, indicated generally at 32; a pair of needles, one of which is shown at 33, which needles are actuated by the mechanism shown, and indicated generally by 34, to rise in the path of the plunger 31 and co-operate with other mechanisms (not shown) to tie the compressed bale.

The plunger 31 is actuated by a connecting rod 35 and crank 36 driven by the power take-off shaft 37, which latter also drives an inclined shaft 38. The shaft 38 in turn drives the horizontal shaft 39 journalled at one end in a support 40 and at the other end in the structure 41.

Figure 2:
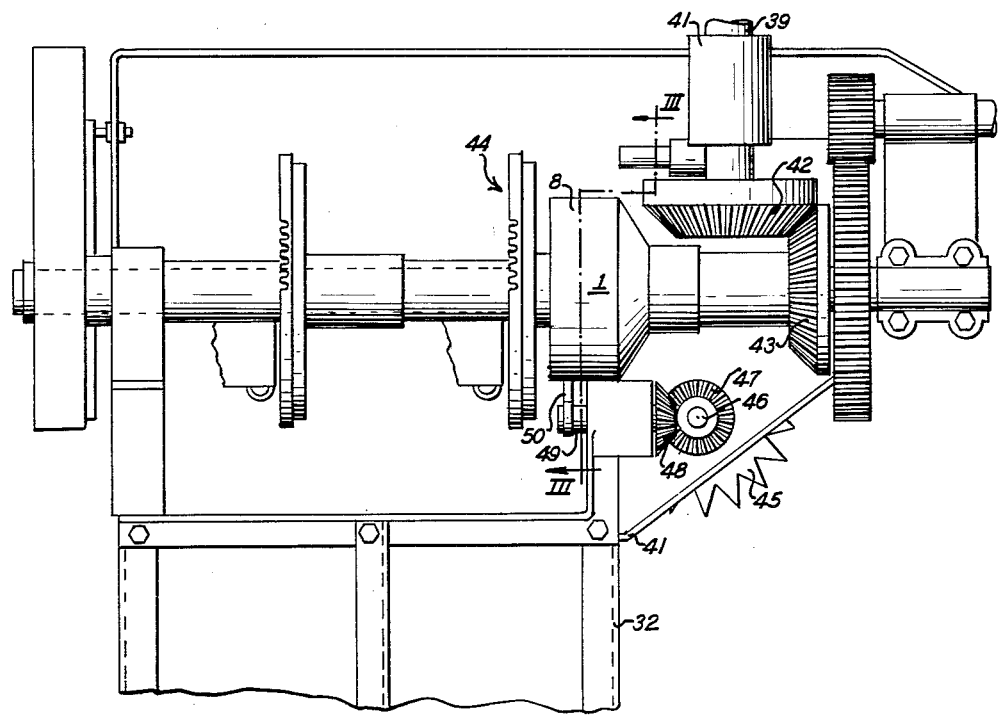
FIGURE 2 is a plan view of a portion of the hay baler as shown in FIG. 1.

Referring to FIG. 2, the structure 41 contains a clutch in a clutch housing 1 driven by the shaft 39 through bevel gears 42, 43, the said clutch housing 1 being adapted to actuate the needles 33 and wire tying mechanism, indicated in part at 44, when a trip dog 4 is drive-connected with the clutch by an internal driving lug 2 on the clutch housing 1, as best seen in FIGS. 3 to 6.

As the hay is moved rearwardly in the bale chamber 32 by the plunger 31 it causes intermittent rotational movement of a star wheel 45 and this rotational movement is conveyed, through shaft 46 and bevel gears 47, 48, to shaft 49.

Shaft 49 carries a trip finger 50 which rotates in a clockwise direction, as seen in FIG. 3, and displaces the trip release lever 13 thus releasing the trip dog 4, as shown in FIG. 4.

The trip release lever 13 is thus selectively displaced out of engagement with the trip dog 4 in accordance with a predetermined rate of rotational movement of the star wheel 45, which constitutes bale length metering means. Provision is customarily made for adjusting and presetting such metering means.

Referring now to FIGS. 3 to 6 of the drawings, the clutch housing 1, which rotates in the direction indicated by the arrow, has an interval driving lug 2 adapted to drive-connect with the part 3 of the trip dog 4 when the trip dog is released as shown in FIGURE 4. In the machine illustrated the part 3 is formed as a roller. When the trip dog 4 is released the part 3 is rotated by the internal peripheral surface 5 of the clutch housing 1 against which it rides until part 3 comes into drive-connection with the lug 2. The trip dog 4 is pivoted on an axial pin 6 in the member 7, which member is fixed to the circular member 8, the latter operating the needle actuating and tying mechanism of the hay baler. The spring 9 biases the trip dog 4 towards the operative position.

An auxiliary trip lever 10, pivoted independently on the pin 6, holds the trip dog 4 in the inoperative position, through the member 11, so long as the lever 10 is retained by the abutment 12 of a trip release lever 13, as in FIGURE 1. The member 11 may be a compression spring to absorb shocks.

The trip release lever 13 is pivoted upon a pin 14 mounted in a portion of the structure 41. The lever 13 has a lug 13a to which is attached one end of a spring 15, the other end of the spring 15a being attached to another portion of the structure 41 whereby the lever 13 is biased by the spring 15 to the position shown in FIGURE 3.

The finger 50 of the bale length metering means co-operates with the step 16 at the outer end of the lever 13 to depress the latter and release the trip dog when a predetermined quantity of hay has been compressed in the bale chamber and is ready for tying.

All the mechanisms so far specifically described with reference to the drawings, and the means for initiating the operation of the trip dog to actuate the tying mechanism, are known and commonly employed in the art.

Release of the trip dog 4 at a time when the lug 2 is in close proximity to it can result in the roller 3 bouncing off the lug 2, after having initiated actuation of the needles, whereupon then becomes necessary for the rotating clutch housing 1 to perform another revolution before positive drive-connection is made between the lug 2 and the trip dog 4 to operate the tying mechanism, during which time the plunger stop dog may come into action with resultant shearing of the safety shear bolt.

To prevent this occurrence, one practical arrangement of the invention provides a cam 21, rigidly attached as by welding to the periphery of the clutch housing 1 and adapted to operate a rocker arm 22, preferably through a roller 23 mounted thereon. This rocker arm 22 may conveniently be pivoted for rocking about the same pin 14 as the trip release lever 13 and is provided at its opposite end with latch means 24, adapted to engage an extension 25 on the lever 10.

The rocker arm 22 is spring biased into the latching position, as shown in FIGURE 3, and this can conveniently be achieved by utilising the existing trip return spring 15 in the manner illustrated in the drawings.

Actuation of the rocker arm 22 by the cam 21 depresses the former and disengages the latch means 24 from the extension 25 (FIGURE 4). The relative positions of the cam 21 and the clutch driving lug 2 are chosen so that the latter is not in close proximity to the trip dog roller 3 when the cam 21 operates the rocker arm 22.

Thus, in operation the invention functions to hold the trip dog 4 (through the lever 10 and the spring 11) in the inoperative position until it is "safe" for it to be tripped. For every revolution of the clutch housing such a "safe" condition periodically occurs and the latch means 24 is accordingly unlatched from the extension 25 once each revolution during the "safe" period. However, so long as the lever 13 retains the lever 10 by the abutment 12 this unlatching has no effect.

When the predetermined quantity of hay has been compressed for a bale to be tied, the metering means will operate the trip finger 50 which in turn will depress the lever 13 and release the trip dog 4. But the latter is is still held by the latch means 24 of the invention until a "safe" condition occurs whereupon the trip dog is allowed to function in its normal manner (see FIGURE 4). Thus the prerequisites for correct functioning are assured before the needle actuating and tying mechanism is brought into operation. Continued rotation of the trip finger 50 causes it to disengage from the step 16 on the lever 13, permitting the latter to return to the position shown in FIG. 3. Likewise, as soon as the cam 21 has passed the cam-follower 23, the rocker arm 22 returns to its operative position (FIG. 3) so that when the member 3 has completed one revolution, corresponding to the completion of a needle actuating and tying operation, both the lever 13 and the rocker arm 22 are in operative position to arrest the lever 10 and disengage the trip dog from the clutch, whereby the trip dog is maintained in its inoperative position pending the next revolution of the trip finger 50.

It will be appreciated by those conversant with the art that during the greater part of each revolution of the clutch housing, the trip dog could be released with safety; it is the relatively short arc of rotation in which the lug 2 and the part 3 of the trip dog are in close proximity that constitutes the danger zone.

Figure 7:
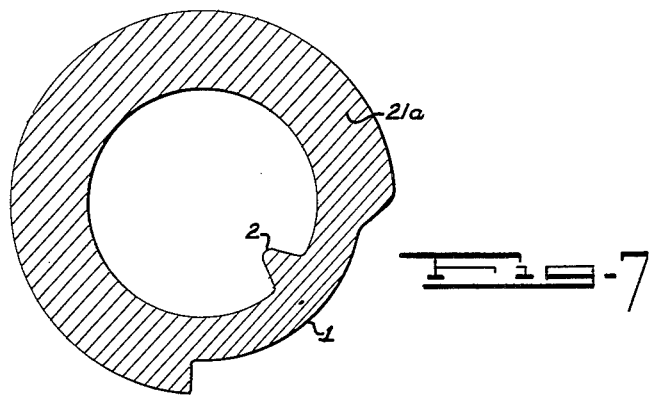
FIG. 7 is a sectional view through the clutch showing a cam according to a further embodiment of the invention.
Figure 5:
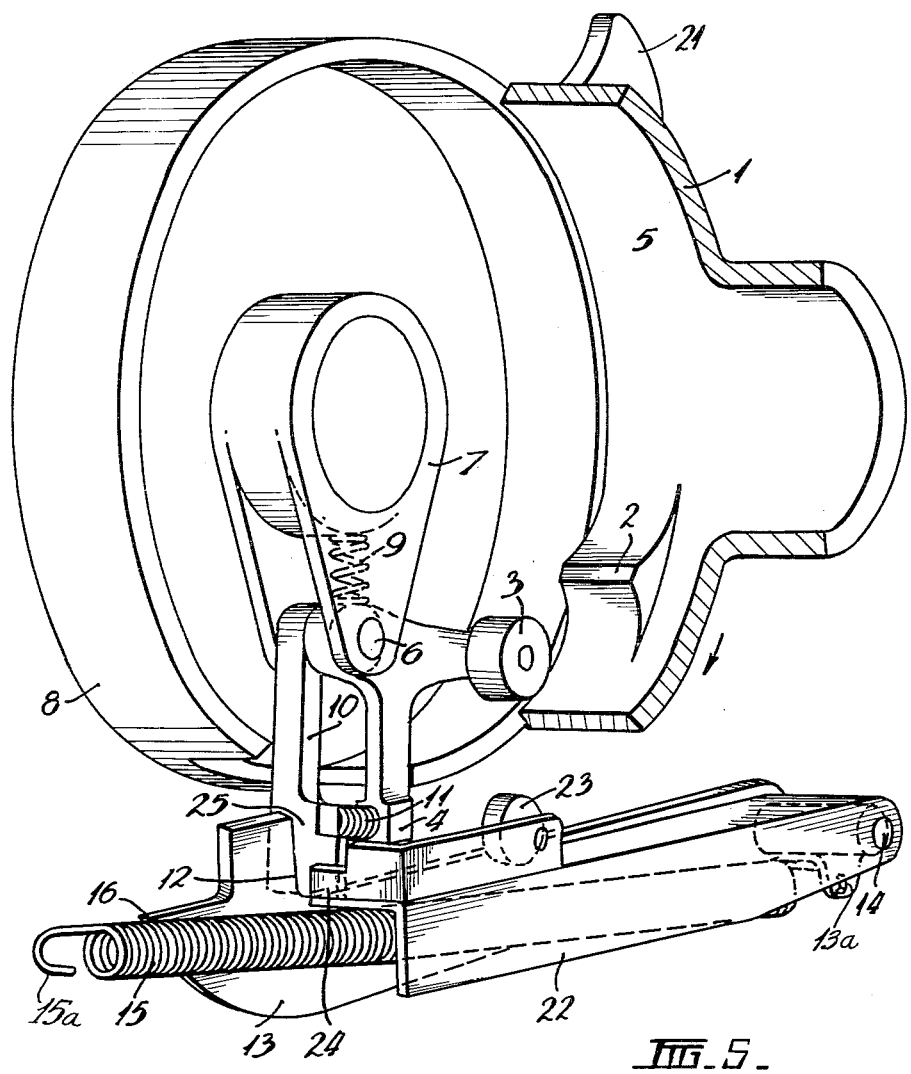
FIGS. 5 and 6 are perspective views of FIGS. 3 and 4 respectively, partly cut away and somewhat diagrammatic, to more clearly illustrate the relative positions of certain of the parts concerned.
Figure 6:
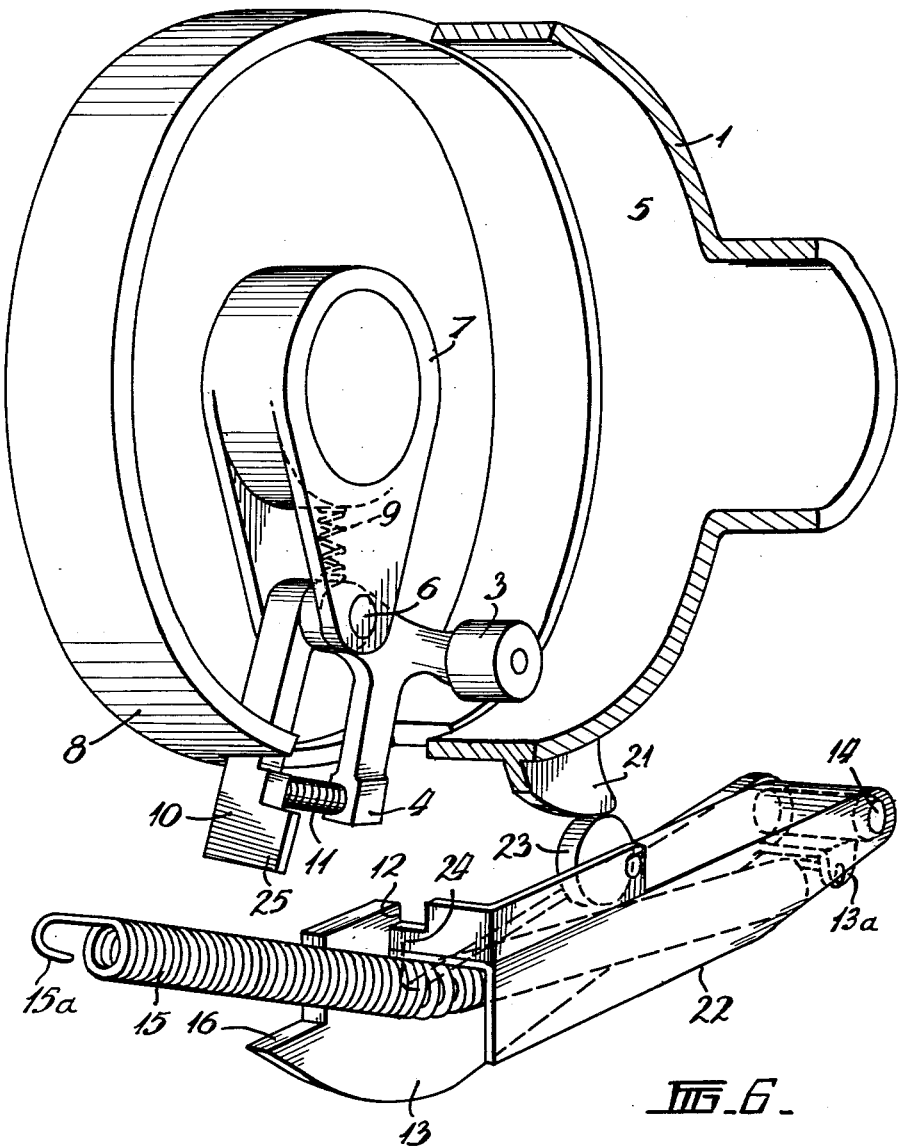

Therefore the cam 21 could be so profiled and of such length that it operates the rocker arm to hold the latch means 24 away from the extension 25 except during the danger period. In FIG. 7 is shown a cam 21a which is of sufficient length to hold the latch means away from the extension 25 for the greater part of a revolution of the clutch housing. In practice, however, because of the much greater wear both on the cam and the roller that would then take place, since they would be almost continually in contact, it is preferred to leave the latch means in the operative position and cause it to be unlatched momentarily during a safe period during each revolution of the clutch housing as this has proven to be the most satisfactory operation. The cam 21 shown in FIGS. 3–5 permits only a momentary unlatching during the safe period.

I claim:

1. In a hay baler of the type having a needle actuating mechanism, a clutch for selectively driving the needle actuating mechanism, a trip dog for selectively coupling said clutch and needle actuating mechanism and a safety device for said trip dog, said safety device comprising: a rocker arm operatively engageable with said trip dog to maintain said trip dog in a first inoperative position, a cam on said clutch for engaging said rocker arm to periodically displace the same out of operative engagement with said trip dog, means coupled to said rocker arm and defining a pivot axis about which said rocker arm pivots during the periodic displacement thereof, a trip release lever operatively engaged with said trip dog to selectively maintain the same in said first position, said trip release lever being selectively displaceable out of engagement with the trip dog, said trip release lever being coupled to said means for pivoting about said axis during displacement thereof, said trip dog being adapted to couple said clutch and needle actuating mechanism in driving relation when said trip release lever and said rocker arm are displaced.

2. A hay baler as claimed in claim 1 comprising resilient means coupled to said means and urging the trip release lever and the rocker arm to operatively engage the trip dog.

3. A hay baler as claimed in claim 1 wherein said clutch has an outer periphery, said cam being on said outer periphery, and extending therealong a distance which is less than half the length of the periphery.

4. A hay baler as claimed in claim 1 wherein said clutch has an outer periphery, said cam being on said outer periphery and extending along a portion of the periphery a distance which is greater than half the length of the periphery.

References Cited in the file of this patent
UNITED STATES PATENTS

| | | |
|---|---|---|
| 2,517,473 | Filarski | Aug. 1, 1950 |
| 2,634,840 | Borzin | Apr. 14, 1953 |
| 2,879,709 | Nelson et al. | Mar. 31, 1959 |